Oct. 3, 1944.    W. M. BROWN    2,359,299
BOGEY ASSEMBLY WITH TRAILING AXLE
Filed Aug. 31, 1942    3 Sheets-Sheet 3
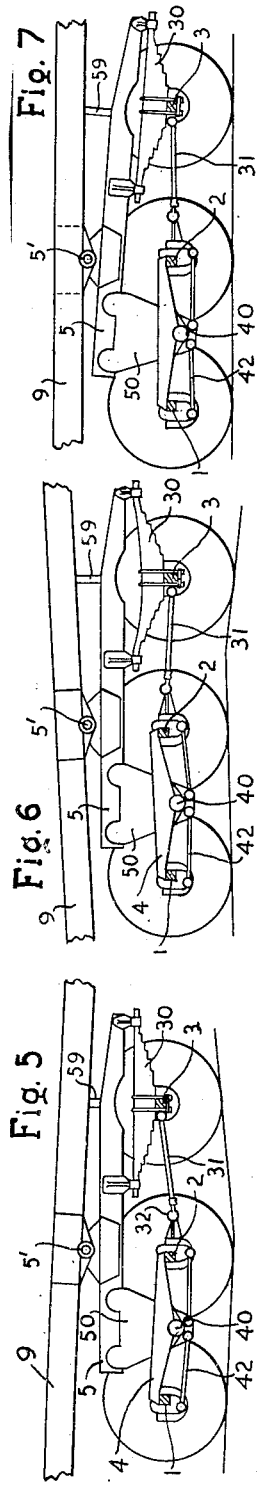
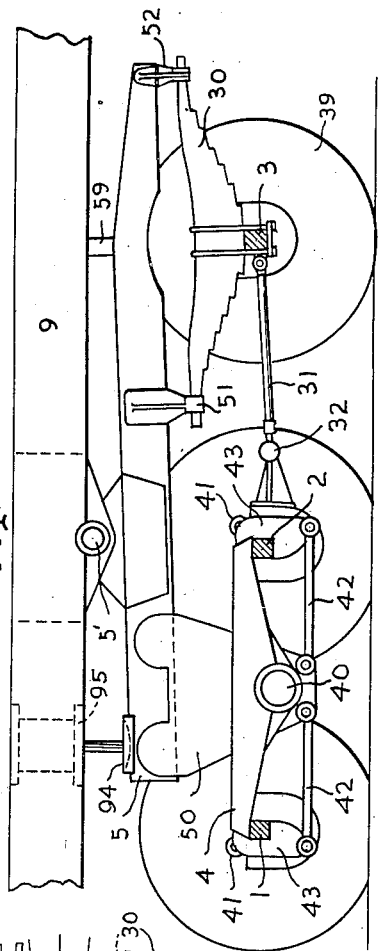
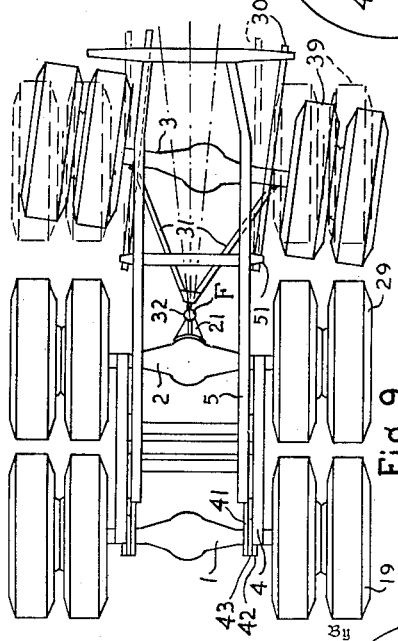
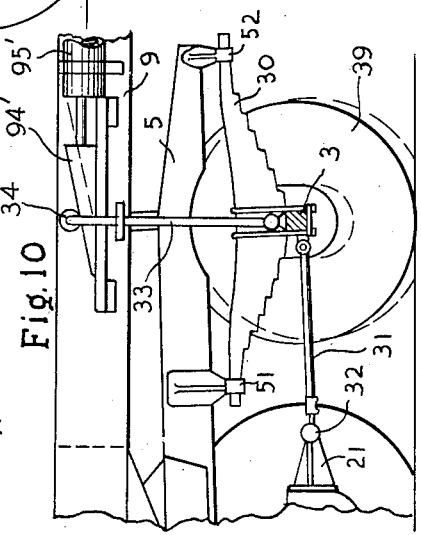
Inventor
Wallace M. Brown
By Reynolds & Beach
Attorneys Patented Oct. 3, 1944

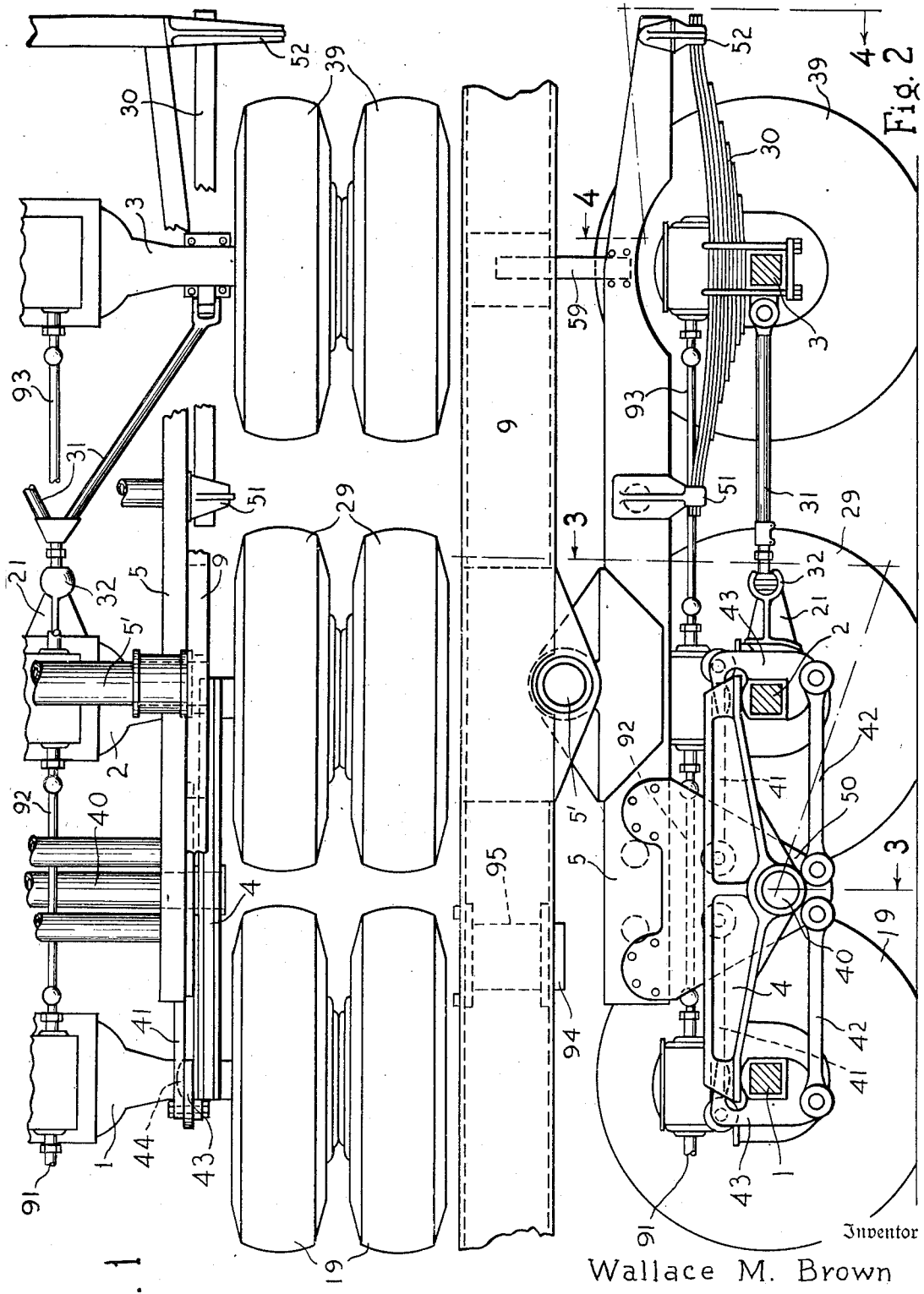

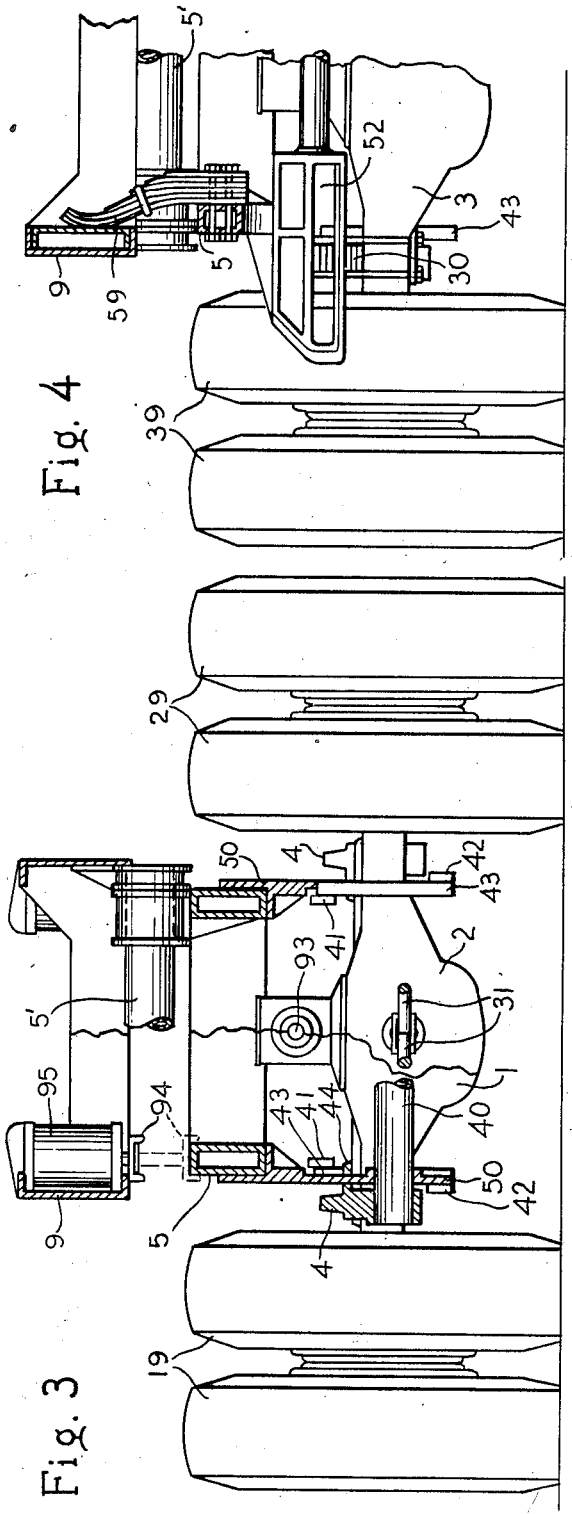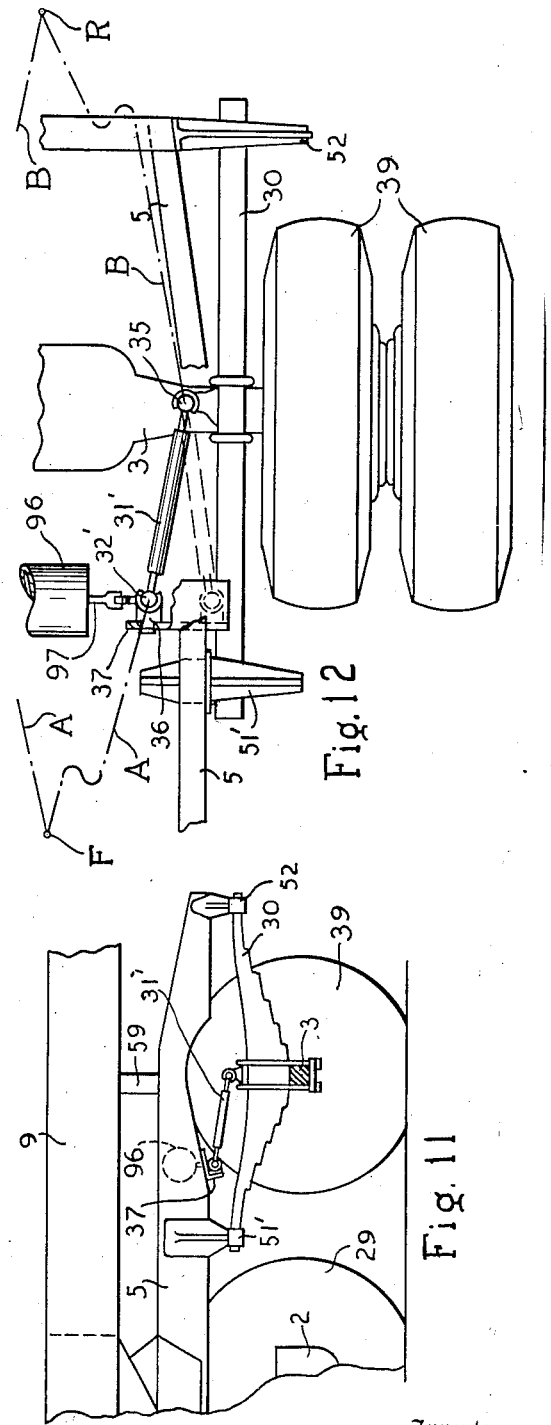

2,359,299

UNITED STATES PATENT OFFICE 2,359,299

BOGIE ASSEMBLY WITH TRAILING AXLE

Wallace M. Brown, Seattle, Wash., assignor to Kenworth Motor Truck Corporation, Seattle, Wash., a corporation of Washington Application August 31, 1942, Serial No. 456,796

34 Claims. (Cl. 180—22)

This invention relates to a truck and a truck bogie assembly, in which one axle of a multi-axle bogie assembly (usually having at least three axles), is supported so that it will trail automatically (as distinguished from positive steering) by swinging laterally, in the normal operation of the truck, even though, as is preferable, the trailing and laterally swingable axle is also power driven.

In a two-axle bogie assembly the truck, in turning, may be assumed to turn about a center lying in a radius extending generally parallel to and intermediate the two axles of the bogie. Since neither axle lies precisely along a radius, this will produce a small amount of sidewise scuffing in making a turn, but because the base line radius of the turn is closely adjacent each axle this scuffing would be negligible, and perhaps no more than might be expected from such extraneous causes as unavoidable misalignment or like causes. However, when the bogie assembly includes three axles which are rigidly held in parallelism the base line radius of the turn is more widely separated from at least one, and sometimes from two of the axles, with the result that the scuffing about the turn becomes noticeable and detrimental, particularly when the load is heavy, as it would be under conditions requiring a three-axle bogie. It becomes necessary, therefore, to effect angular displacement, as in steering, of the wheels of one of the axles. Heretofore this has been done by steering the wheels positively, while still holding the axle parallel to the others. While this simplifies support from and springing of this axle, it introduces complications of alignment, lack of ruggedness, and undue wear or breakage of steering mechanism.

The present invention presents a solution which avoids these difficulties (which it is particularly necessary to avoid under the handicaps of military service) by eliminating steering of the wheels relative to their axle, and by substituting a free trailing axle, and a draft connection therefor which permits the axle to lie always in its own radius through the center of the turn. On straightaways the above is still true, remembering that the center of the turn is then, for all axles, at infinity.

The idea of a trailing axle in a multi-axle bogie may be incorporated in one axle only, or in all but one of the axles of a bogie assembly, or indeed in all such axles. In some cases it may be adopted for a single axle. It may be employed whether the trailing axle is a driven axle, or only a dummy axle, and regardless of whether the non-trailing axles are live or dummy. In all cases the trailing axle bears its full share of the load, and it may be sprung or unsprung.

A three-axle bogie assembly, in which one of the axles swings sidewise in trailing about a curve, introduces complications of drive, of support, and of vertical flexibility and resilience of the whole, and of yieldability of the various axles with respect to each other, under conditions of varying load, and under conditions where the bogie comes out on a level after coming down hill or comes over the crest of a hill. Further problems arise in connection with backing, when one of the axles is normally arranged for free trailing when going forward. Such an axle, in backing, will act comparably to a semi-trailer, and while it can be controlled by a skilled driver, under most circumstances, yet an unskilled driver will encounter serious difficulty in properly controlling the truck to prevent jack-knifing of such axle and in backing in the direction intended. It is preferable, therefore, to relieve such trailing axle from any appreciable load, preparatory to backing, or even to lift it clear of the ground, or to reverse its effective instantaneous center of trail.

The present invention, as applied to a three-axle bogie assembly, has for its general aim the provision of such a bogie in which one axle, at least, of the three is arranged for trailing (and usually, though not necessarily, this would be the rearmost axle), and which has also means affording simple and proper solutions for the subsidiary problems mentioned above.

Broadly speaking, the primary aim of the invention is to provide a truck support which includes a trailing axle so assembled and arranged that for all forward movement it lies automatically in a radius about the center of the turn, and regardless of whether it is or is not a driving axle, and yet it is so arranged and assembled that it bears its proportion of the load, and may yield, relative to the load, as is necessary to give effect to spring means, if these are somewhere incorporated in the entire assembly.

It is also an object of this invention to provide a three-axle bogie assembly which, to the highest degree possible, utilizes standard constructions and parts now readily available.

With regard to a three-axle or other multi-axle bogie assembly generally, whether or not any axle trails, but particularly if one axle or more does trail, it is an aim to distribute the load substantially equally, under all conditions, upon the several axles; it is also an object to simplify and to concentrate the springing of the assembly, and to afford ample vertical movement of each axle relative to the main truck frame.

In one form of the invention, it is an object to provide means whereby, in backing, the trailing axle's draft means may, in effect, be reversed, so that it trails from an instantaneous center of trail behind the axle rather than, as normally, from a center ahead of the axle.

With these and other objects in mind, as will appear as the description progresses, my invention comprises the novel assembly and arrangement of parts, and the novel parts and sub-assemblies of the whole, as shown in the accompanying drawings, described in this specification, and as will be more particularly defined by the claims which terminate the same.

In the accompanying drawings I have shown my invention in a form such as is at present preferred by me, it being understood that various changes may be made in the form of the several parts and in their relative arrangement, within the principles of this invention as hereinafter made clear, without departing from the spirit of this invention.

Figure 1 is a half plan view of the bogie assembly, with the truck frame omitted and with parts broken away for clearer illustration, and Figure 2 is a side elevation, with the near wheels omitted and the axles themselves shown in section, illustrating one embodiment of the invention.

Figure 3 is a cross-section substantially on the line 3—3 of Figure 2, and Figure 4 is a half rear elevation, with certain parts in section on the line 4—4 of Figure 2.

Figures 5, 6, 7 and 8 are diagrammatic side elevations, similar to Figure 2, showing the interaction of the parts and the extent of relative vertical movement permitted, under various circumstances, and Figure 9 is a similar plan view, showing how the rear axle trails during forward movement.

Figure 10 is a fragmentary view, similar to Figures 5, 6, 7, and 8 (the latter of which shows one way of relieving the trailing axle of the load, to enable backing), showing an alternative way of lifting the trailing axle from effective contact with the ground.

Figure 11 is a side elevational view, similar to Figure 10, and Figure 12 is a partial plan view, similar to Figure 1, illustrating diagrammatically how the effective instantaneous center of trail may be reversed, for backing, to a point behind, instead of ahead of, the axle.

In the illustrative embodiments shown in the drawings it is the rear axle which has been shown as the trailing axle. However, the choice of this particular axle is not required by my invention in its broadest aspect, but instead, as I have already indicated, any one of the three axles might be trailing, and still the principal end in view might be accomplished. However, the invention is best described by reference to the three-axle construction shown, and no further reference need be made to other forms.

In the three-axle bogie assembly illustrated, the front and intermediate axles are connected largely in a conventional manner to support a frame element corresponding to the normal bogie frame of a two-axle bogie, but which now becomes a sub-bogie frame, and from this sub-bogie frame is rockably supported the forward end of an overlying main bogie frame. The rear end of the main bogie frame is supported from the trailing and laterally shiftable rear axle, which is arranged to swing, usually about a centralized point ahead of it, through a draft connection such as a wishbone, and provision is made for permitting sidewise slippage between the rear axle, in trailing, and the rear end of the main truck frame, or, as shown, the rear axle's sidewise movement is relative to the main bogie frame. The truck is supported, usually rockably, from the main bogie frame. The leverage of the several frames is such that, by rocking, a maximum of vertical movement of each axle is assured, yet each axle bears a load comparable to any other single axle. The springing may be accomplished at various points in the assembly, but in the arrangement shown is primarily and preferably accomplished between the trailing rear axle and the rear end of the main bogie frame. In the arrangement shown all three axles are power driven, although this is no essential part of my invention, and the arrangement shown provides for a drive from the front to the intermediate to the rear axle in succession, although this precise arrangement is largely immaterial. When employed the drive connection is sufficiently flexible to permit the required independent movements of each axle with respect to the other two.

Various provisions are possible to enable backing. For example, provision is made for taking the load off the trailing rear axle, and two means to this end are shown, one in Figure 8, in which the rear wheels continue to rest upon the ground, though the load is removed from them, and the other in Figure 10, in which the rear wheels are or may be bodily lifted out of contact with the ground. A further provision, shown, in Figures 11 and 12, reverses, in effect, the location of the centralized draft point, and locates the draft point behind the trailing axle, so that it trails also while backing.

The forward, intermediate, and rear axles are designated, respectively, 1, 2, and 3. The two front axles 1 and 2 are intended, in the present instance, to remain always parallel to each other, and to be joined by and to support what is in effect, if not in fact, a sub-bogie frame, consisting essentially of two side plates 4 joined by a cross tube 40, together with means to hold the axles 1 and 2 to the sub-bogie frame as thus constituted, and to maintain them upright at all times. The cross tube 40 constitutes a pivot for the sub-bogie frame with respect to the main bogie frame 5 through a pivot bracket 50, which depends from the main bogie frame 5, and which receives the cross tube 40. The axles, as is conventional in a bogie assembly, may be held upright by parallel links 41, 42, connected to the respective axles at top and bottom, and connected at their inner ends to the bracket 50. These parallel links also restrain the axles from moving longitudinally with respect to the sub-bogie frame members 4, therefore the connection between the sub-bogie frame members 4 and the axles may be completed by the brackets 43 which are mounted upon the axles, and which span lateral flanges 44 (see Figure 1) on the sub-bogie side plate 4.

By this construction the axles 1 and 2 of the sub-bogie assembly may, by rocking about the pivot 40, rise and fall with respect to each other, though oppositely, and thus the entire sub-bogie assembly rocks with respect to the main bogie frame 5 about this pivot 40. This arrangement is largely conventional, except that in a two-axle bogie assembly a spring is usually employed where now is used the rigid side plate 4. Such a spring might still be employed, but preferably the load is otherwise sprung.

The sub-bogie assembly just described, through its wheels 19 and 29, respectively, supports the forward end of the overlying main bogie frame 5. The rear end of the main bogie frame 5 extends rearwardly of the sub-bogie assembly and over the rear axle 3. This rear axle supports the rear end of the main bogie frame 5 through the spring 30, shown as a leaf spring clamped to the upper side of the axle 3 and movable with this axle, both laterally as well as vertically. The ends of this spring 30 are received in forward and rear slipper brackets 51 and 52 carried by the main bogie frame, and thereby the axle is maintained upright. These brackets are so formed as to permit sidewise shifting in giving effect to the lateral swinging of the rear axle 3.

The rear axle 3 is provided with a draft connection permitting this swinging automatically under the influence of forward draft. In the form shown in Figures 1 to 10 inclusive this draft connection takes the form of a wishbone 31, connected outwardly toward the ends of the rear axle 3, as best seen in Figure 1, and extending thence forwardly to a central draft point F (see Figures 9 and 12), where a pivot support is provided at 32, which permits at least lateral sidewise movement of the axle with its swinging, and vertical rising and falling movement. Preferably also it permits sidewise tilting of the axle, as the spring on one side is flexed more greatly than the spring on the other side, and vice versa, or the axle 3 tilts relative to axle 2. The pivot support at 32 is therefore preferably in the form of a universal joint. This universal joint is supported in any convenient manner from the main bogie frame. For convenience of the drive connection it may well be supported from the sub-bogie frame, and, specifically, from the intermediate axle 2, through its bracket 21.

The main bogie frame 5 is supported through the transverse pivot tube 5' from the main truck frame 9, so that the entire bogie assembly may rock on the tube 5'. In order to relieve this tube from twisting stresses guides such as the springs 59 may be provided, extending upwardly from the main bogie frame 5 and bearing upon the opposite sides of the truck frame 9 (see Figure 4). These resist any tendency for the main bogie frame 5 to swing transversely with respect to the main truck frame, and relieve the cross tube 5' of a large part of the twisting stresses.

As has already been said, just which of the axles is a driving axle (or whether any of them is driven) is immaterial so far as the principles of my invention are concerned, and if they are all driven the precise manner in which the drive is connected to each of them is also immaterial. However, as shown herein, each axle incorporates a differential housing, and the drive is from the power shaft at 91 to the forward axle 1, thence through the drive shaft section 92, with its universal joints forward and rear, to the differential of the axle 2, and thence by the drive shaft section 93 to the differential of the rear axle 3. The cross-sections of the axles have not attempted to illustrate details of the drive, as these are no part of this invention, and any conventional arrangement may be employed.

It is believed it will now be clear that the sub-bogie assembly, including the axles 1 and 2, may rock as a whole about the axis defined by the pivot tube 40, with respect to the main bogie frame 5. The action here is substantially the same as in any two-axle bogie assembly. Now since the main bogie frame 5 is supported at its forward end by this sub-bogie frame, the center of support being the pivot tube 40, it, too, may rock about the pivot tube 5', and its rear end is supported through the spring 30 from the axle 3. So long as the axles 1, 2, and 3 are parallel to each other the only important action is a rocking action, as indicated, and this action is shown in Figures 5, 6, 7, and 8. The spring 30 springs any such rocking action of the bogie assembly as a whole or of any part thereof with respect to the main truck frame 9, and no other springs are necessary, although, as has been indicated, the spring might be otherwise disposed than between the rear axle and the bogie frame.

The relative location of the pivots 40, 5', and of the axles 1, 2, and 3 is of importance in equal distribution of the load. Axles 1 and 2 are equidistant from pivot 40; the latter is one-half the distance of axle 3 from pivot 5'. This equalizes the load upon all the axles. This leverage arrangement also enables the greatest freedom and amplitude of vertical movement of each axle, relative to the others; if pivot 40 may rise only half as high as axle 3, still either of the axles 1 and 2, by rocking about pivot 40, may rise as high as axle 3, if need be.

When the truck goes around a turn, the road friction on the wheels 39 of the rear axle 3 tends to swing this axle sidewise, as is shown in full lines in Figure 9, and this action is permitted due to the universal pivot support at 32. The ends of the spring 30 slide sidewise in the slipper brackets 51 and 52, and the rear axle 3 becomes truly trailing, behind the forward point of trail F. This sidewise swinging in trail of the rear axle does not in any way affect its vertical or sidewise rockability or yieldability, which continues effective as before. When the truck resumes movement along a straightaway the rear axle 3 again trails automatically and falls in behind the axles 1 and 2 in parallelism thereto, as is shown in dash lines in Figure 9. In all this movement the drive connection to the several axles is not interrupted, and continues effective.

It will be realized that whenever it is desired to back up, the normally trailing rearmost axle 3 will become the foremost axle, and will have to be pushed forwardly by the draft connection, and if it still tends to trail will cock sideways with respect to the other wheels and will tend to steer the bogie assembly as a whole in a different direction from that in which the other axles attempt to steer it. The result is confusion, and either the bogie assembly will not move in any direction, or the wheels which are transverse to the direction in which it moves will be badly scuffed. A skillful semi-trailer driver will be able to maneuver his truck to avoid such difficulties, at least under conditions of favorable load and roadway surface, but an unskilled driver will find himself unable to back up.

One way of overcoming these difficulties is illustrated in Figures 1 to 4, and in Figures 8, namely, the provision of means reacting between the main truck frame 9 and the main bogie frame 5 to take the load off the rear axle 3. To this end a cylinder 95 may be mounted on the truck frame, and its plunger, carrying a head 94, presses downwardly on the forward end of the main bogie frame 5, thereby lifting the rear end of the main bogie frame and taking the load off the rearmost axle 3. This arrangement might be reversed to the extent of mounting the cylinder on the main bogie frame to react from the truck frame. The effect is the same in either case.

A somewhat different solution is shown in Figure 10, where the trailing rear axle 3 can be directly and bodily lifted to clear its wheels 39 from the ground. Here a cylinder 95', acting through a wedge 94', engages a roller 34 on a rod 33 which projects upwardly from the axle 3, the wedge and the cylinder being carried by the main truck frame, and the axle 3 is lifted by engagement of the wedge and the roller until the wheels 39 support no effective load, or are entirely clear of the ground. The load, it will be observed, is still sprung.

A further solution is shown in Figures 11 and 12. According to this solution the effective instantaneous center of trail, normally located at F when axle 3 is parallel to axles 1 and 2, is reversed, and is located, during the time the truck is backing, at the point R, which is to the rear of the rear axle. Instead of employing a complete wishbone, drawing from a single point of draft, only parts of an interrupted wishbone are employed, consisting of the draft links 31'. These are connected by universal joints 35 to the axle, and at 32' to a bracket 36, which is supported from the bogie frame 5. The bracket 36 is mounted for lateral sliding in a guide 37 which is carried upon the bogie frame 5.

Normally the bracket 36 is held at the inner end of its guide, as is shown in full lines in Figure 12, and in this position the draft links 31' lie in an inclined line A, the two lines A from opposite sides intersecting at the apparent forward point of draft F. When it is desired to back up, the bracket 36 is slid outwardly, until the draft link 31' assumes the oppositely inclined dash-line position of Figure 12, when it lies in the apparent wishbone, indicated by the lines B, which meet at a rearward apparent point of draft R. The shifting is accomplished by any convenient means, indicated diagrammatically by the pressure cylinder 96 carried on the bogie frame 5, with its plunger 97 connected to the bracket 36. When the location of the bracket has been thus shifted to the dash line position of Figure 12, the axle 3, in effect, trails from an instantaneous center behind such axle, located at point R when axle 3 is parallel to axles 1 and 2, during rearward movement of the vehicle. Thus it is unnecessary to lift the rear wheels or to relieve them of load while backing, for the axle 3 and links 31' will swing to incline the wheels toward alignment with the path of a turn as the vehicle backs. The springs 30 are still free to slide transversely in the slipper brackets 51' and 52, and to bear the load, although the forward bracket 51' must be wider than bracket 51 in Figures 1 to 9, preferably being equal to bracket 52 in width. Such a wide bracket affords room, during backing of the truck, for the greater swing of the front end of the spring carried by bracket 51', just as in the form in which the center of trail is always ahead of the axle the rear bracket 52 is wider than the bracket 51, to allow for greater swing of the rear end of the spring 30 when the truck is going forward.

What I claim as my invention is:

1. A three-axle truck bogie assembly comprising a front and an intermediate axle, a sub-bogie frame, and means supporting said sub-bogie frame from said two axles to constitute a sub-bogie assembly; a main bogie frame overlying the sub-bogie frame; means on the main bogie frame to support a truck frame for relative pivoting about a transverse axis; means interconnecting the two bogie frames for relative movement which has a vertical component and for support of the forward end of the main bogie frame from the sub-bogie assembly; a rear axle; load supporting spring means directly interconnecting the rear axle and the rear end of the main bogie frame; and draft means connected to the rear axle, and arranged for lateral movement of the rear axle in trail behind the sub-bogie assembly.

2. A three-axle truck bogie assembly comprising a front and an intermediate axle, a sub-bogie frame, and rigid means supporting said sub-bogie frame from said two axles to constitute a sub-bogie assembly; a main bogie frame overlying the sub-bogie frame and extending rearwardly thereof; means on the main bogie frame to support a truck frame for relative pivoting about a transverse axis; supporting means interconnecting the two bogie frames for relative pivotal movement about a transverse axis located intermediate the front and intermediate axles; a rear axle; load-supporting spring means directly interconnecting the rear axle and the rearward extension of the main bogie frame; and draft means connected between the rear axle and the sub-bogie assembly, and arranged for lateral movement of the rear axle in trail behind the sub-bogie assembly.

3. A three-axle truck bogie assembly comprising a front and an intermediate axle, a sub-bogie frame, and means supporting said sub-bogie frame from said two axles to constitute a sub-bogie assembly; a main bogie frame overlying the sub-bogie frame; means on the main bogie frame to support a truck frame for relative pivoting about a transverse axis; supporting means interconnecting the two bogie frames for relative movement which has a vertical component; a rear axle; load-supporting spring means directly interconnecting the rear axle and the rear end of the main bogie frame; and draft means connected at its forward end for universal pivoting about a central point on the sub-bogie assembly, and connected at its rear end to the rear axle.

4. A three-axle truck bogie assembly comprising a front and an intermediate axle, a sub-bogie frame, and means supporting said sub-bogie frame from said two axles to constitute a sub-bogie assembly; a main bogie frame overlying the sub-bogie frame and extending rearwardly thereof; pivot means disposed along a transverse axis lying intermediate said two axles, interconnecting the two frames for relative pivotal movement; pivot means disposed along a transverse axis lying rearwardly of such first-mentioned pivot axis, and carried by the main bogie frame to support a truck frame for relative pivotal movement; a rear axle; load-supporting spring means interconnecting the rear axle and the rearward extension of the main bogie frame; and draft means engaging the rear axle and mounted at its forward end for vertical and lateral pivotal movement of such rear axle about a point intermediate the ends of and ahead of the rear axle.

5. A three-axle truck bogie assembly comprising a front and an intermediate axle, a sub-bogie frame, and supporting means interconnecting the sub-bogie frame and said two axles, and maintaining said two axles in parallelism, the whole constituting a sub-bogie assembly; a main bogie frame; pivot means interconnecting the two bogie frames for relative pivotal movement about a transverse axis; transverse pivot means arranged on the main bogie frame parallel to the first-mentioned pivot means, for engagement with a truck frame; a rear axle; draft means engaging the rear axle and arranged for universal pivotal movement of such rear axle about a central point ahead thereof; and load-supporting spring means operatively interposed between said rear axle and the rear end of the main bogie frame.

6. A three-axle truck bogie assembly comprising a front, a rear and an intermediate axle; means interconnecting the front and intermediate axles to distribute the load between said two axles, and for corresponding and for opposite vertical movement, and maintaining them at all times in parallelism; draft means engaging the rear axle to maintain it in trail behind the intermediate axle, and arranged to permit its lateral, vertical, and sidewise tilting movement relative to the other two axles; and load-supporting means operatively connected between said rear axle and the other two axles, including spring means to distribute the load between the three axles in all their relative positions.

7. A truck bogie assembly comprising a bogie frame; means carried by the bogie frame for supporting a truck frame, and permitting relative movement which has a vertical component between the two frames; means, including a transverse axle, for supporting the forward end of the bogie frame; a rear axle; draft means connected directly to said transverse axle by its forward end for vertical and for transverse swinging relative to the bogie frame, and connected by its rear end directly to the rear axle; and load-supporting spring means independent of said draft means and interengaged directly between one of said axles and the bogie frame.

8. A truck bogie assembly comprising a bogie frame; a transverse pivot means carried by said bogie frame, intermediate its ends, for supporting a truck frame; means, including a transverse axle, supported from said bogie frame towards its forward end, and supporting the latter; a transverse rear axle; draft means extending forwardly from the rear axle; a universal pivot support for the forward end of said draft means, located intermediate the sides of the bogie frame; and load-supporting spring means interposed between said rear axle and the bogie frame, in all positions of the rear axle.

9. A truck bogie assembly comprising a bogie frame; a transverse pivot means carried by said bogie frame, intermediate its ends, for supporting a truck frame; means, including a transverse axle, supported from said bogie frame towards its forward end, and supporting the latter; a transverse rear axle; draft means extending forwardly from the rear axle; a universal pivot support for the forward end of said draft means, located intermediate the sides of the bogie frame; load-supporting spring means interposed between said rear axle and the bogie frame, in all positions of the rear axle; and a power drive to the forward axle and thence to the rear axle, including a forward and a rear universal joint between the axles, to permit universal pivoting of the driven rear axle.

10. A truck bogie assembly comprising a bogie frame, a rear axle, means including a forward axle cooperating with the rear axle to support said frame, a wishbone connected directly to said forward axle by a universal joint and connected to the rear axle to permit lateral swinging, vertical movement, and sidewise tilting of the rear axle relative to said forward axle.

11. A truck bogie assembly as in claim 10, and spring means interengaged directly between one of said axles and the bogie frame.

12. A truck bogie assembly as in claim 10, characterized in that the spring means comprises a leaf spring joined between its ends to the axle, to swing with the latter, and slipper brackets carried by the bogie frame, receiving the ends of the spring for lateral sliding.

13. In a truck bogie assembly, a bogie frame; means to support therefrom a truck frame for relative rocking movement about a transverse axis; a rear axle; a wishbone projecting forwardly from said rear axle, and a universal pivot support for the forward end of the wishbone, supported from the bogie frame and centralized between its sides; load-supporting spring means interposed between the rear axle and the bogie frame; and ground-engaging means to support the forward end of the bogie frame.

14. A truck bogie assembly comprising a bogie frame; means carried by the bogie frame for supporting a truck frame, and permitting relative movement which has a vertical component between the two frames; means, including a transverse axle, for supporting the forward end of the bogie frame; a rear axle; draft means supported at its forward end for vertical and for transverse swinging relative to the bogie frame, and connected at its rear end to the rear axle; load-supporting spring means interposed between one of said axles and the bogie frame; and means operable at will to relieve the rear axle from any material support of the load.

15. In combination with a truck frame; a main bogie frame; means pivotally connecting said two frames for tilting about a transverse axis intermediate the ends of the main bogie frame; a sub-bogie frame; means pivotally connecting said two bogie frames for tilting about a transverse axis located adjacent the forward end of the main bogie frame, and intermediate the ends of the sub-bogie frame; means, including a transverse axle at one end of the sub-bogie frame exerting an upward load thereon, and including means at the opposite end of the sub-bogie frame to exert a counteracting force thereon, to support the sub-bogie frame and hence the forward end of the main bogie frame; a rear axle; draft means connected to the latter, and including means permitting its transverse swinging about a center ahead of it and intermediate its ends, and also permitting rising and falling of the rear axle; and load-supporting spring means interposed between the rear axle and the rear end of the main bogie frame.

16. In combination with a truck frame; a main bogie frame; means pivotally connecting said two frames for tilting about a transverse axis intermediate the ends of the main bogie frame; a sub-bogie frame; means pivotally connecting said two bogie frames for tilting about a transverse axis located adjacent the forward end of the main bogie frame, and intermediate the ends of the sub-bogie frame; means, including a transverse axle at one end of the sub-bogie frame exerting an upward load thereon, and including means at the opposite end of the sub-bogie frame to exert a counteracting force thereon, to support the sub-bogie frame and hence the forward end of the main bogie frame; a rear axle; draft means connected to the latter, and including means permitting its transverse swinging about a center ahead of it and intermediate its ends, and also permitting rising and falling of the rear axle; leaf springs connected to the opposite ends of the rear axle, and extending forwardly and rearwardly thereof; and laterally widened pairs of slipper brackets carried by the rear end of the main bogie frame and engaging the ends of said leaf springs, and permitting transverse movement of the latter as the rear axle swings laterally.

17. A truck bogie assembly comprising three axles arranged in tandem, a sub-bogie frame supported from two of said axles, a main bogie frame arranged to support a truck frame, and supported in part from and rockable relative to the sub-bogie frame, and supported in part from the third axle, draft means engageable with said third axle, and arranged for transverse swinging thereof relative to the forward and intermediate axles, and spring means in the assembly interposed between one of said axles and the main bogie frame, for springing of the assembly.

18. A truck bogie assembly as in claim 17, including drive means operatively connected to said transversely swingable axle, and including flexible connections effective to permit the described relative rocking and swinging of said axle relative to the other axles.

19. A truck bogie assembly as in claim 17, including a drive connection to the forward axle, and further drive connections thence in turn to the intermediate axle and to the rear axle, said drive connections including flexible connections affording the described rocking and swinging motions of the axles and frames relative to each other.

20. A truck bogie assembly as in claim 17, wherein the spring means is a leaf spring fixed to each end of the transversely swingable axis, and slipper brackets carried by the main bogie frame and receiving the ends of said leaf springs for transverse movement of the latter.

21. In a truck bogie assembly, an axle, a frame supported in part from said axle, a draft connection from said frame, extending rearwardly to said axle, and including means affording lateral swinging in trail and rising and falling motions to the axle, and a load-supporting leaf spring connected between its ends to said axle, to swing therewith, and slipper brackets carried by the frame, receiving the ends of the spring for lateral sliding as the axle swings.

22. In a truck bogie assembly, an axle, a frame supported in part from said axle, and a draft connection from said frame extending rearwardly to said axle, and including two rigid links converging forwardly and connected to the axle and guiding it for automatic lateral swinging in trail.

23. In a truck bogie assembly, an axle, a frame supported in part from said axle, a draft connection from said frame extending rearwardly to said axle, and including means centered, in effect, at an instantaneous center of trail ahead of the axle and intermediate its ends, and arranged to afford automatic lateral swinging in trail and rising motions to the axle, and means to lift said axle, from said frame, for backing.

24. In a truck bogie assembly, an axle, a frame supported in part from said axle, a draft connection from said frame extending rearwardly to said axle, and including two rigid links normally converging forwardly and connected to the axle and guiding it for automatic lateral swinging in trail, and means shiftable at will to reverse the direction of convergence of said links, thus to guide the axle in trail during backing.

25. In a truck bogie assembly, an axle, a frame supported in part from said axle, draft links extending forwardly from each end of the axle, and directed towards a common instantaneous center of trail, located ahead of the axle and intermediate its ends, means to support the forward ends of the links from the frame for rising and falling and for lateral movement of the links and axle, and means to shift said supporting means and to alter the relative angularity of said links, to direct them to a common alternative instantaneous center of trail, located behind the axle and intermediate its ends, for backing.

26. In combination with a main truck frame, a multi-axle bogie assembly comprising a main bogie frame rockably supporting the truck frame, a sub-bogie frame rockably supporting an end of the main bogie frame, an axle supporting the other end of the main bogie frame, two axles supporting the sub-bogie frame, one at each side of its axis of rocking relative to the main bogie frame, and means guiding said first axle for swinging and endwise displacement relative to said main bogie frame in trail.

27. In combination with a main truck frame, a multi-axle bogie assembly comprising a main bogie frame rockably supporting the truck frame, a sub-bogie frame rockably supporting an end of the main bogie frame, means including an axle supporting the other end of the main bogie frame, draft means extending forwardly from said axle, including a centralized universal support from a bogie frame, permitting such axle to trail, and two axles supporting the sub-bogie frame, one at each side of its axis of rocking relative to the main bogie frame, the lever arms of the axles and the bogie frames being of such relative length as to distribute the load substantially equally upon all the axles.

28. In combination with a main truck frame, a multi-axle bogie assembly comprising a main bogie frame rockably supporting the truck frame, an unsprung sub-bogie frame rockably supporting an end of the main bogie frame, a single axle supporting the other end of the main bogie frame, and two unsprung axles supporting the sub-bogie frame, one at each side of its axis of rocking relative to the main bogie frame, the lever arms of the axles and the bogie frames being of such relative length as to distribute the load substantially equally upon all the axles, and spring means interposed between said single axle and said main bogie frame.

29. In combination with a main truck frame, a multi-axle bogie assembly, comprising a main bogie frame supporting the truck frame at a location generally centrally of said main bogie frame, a sub-bogie frame supporting an end of the main bogie frame, two axles supporting said sub-bogie frame, a single axle supporting the other end of said main bogie frame and spaced from the nearer axle supporting said sub-bogie frame by a distance greater than the spacing of said two axles supporting the sub-bogie frame, the distance from the location at which the main bogie frame supports the truck frame to said single axle supporting an end of the main bogie frame being equal to the sum of the distances between the location at which the main bogie frame supports the truck frame and each of said axles supporting said sub-bogie frame 30. A truck bogie assembly, comprising a main bogie frame, a transverse pivot means carried by said main bogie frame intermediate its ends for supporting a truck frame, a sub-bogie frame rockably supporting an end of the main bogie frame, two axles supporting said sub-bogie frame, a single axle supporting the other end of said main bogie frame, means guiding said single axle for swinging relative to said main bogie frame, and power drive means interconnecting all said axles to drive the same, including a universal joint between said single main bogie frame axle and the adjacent axle of said sub-bogie frame.

31. In a truck bogie assembly, an axle, a frame supported in part from said axle, a draft connection from said frame extending rearwardly and connected directly to said axle, and including means affording lateral swinging in trail and rising and falling motions to the axle, and load-supporting spring means independent of said draft connection and engaging directly both said axle and said frame.

32. In combination with a main truck frame, a bogie frame rockably supporting the truck frame, axle means supporting the ends of said bogie frame, and means interengageable between said truck frame and said bogie frame to tilt said frames positively relative to each other, thereby to increase the load on the means supporting one end of said bogie frame and to decrease correspondingly the load on the means supporting the other end of said bogie frame.

33. In a truck bogie assembly, an axle, a frame supported in part from said axle, a draft connection from said frame extending rearwardly to said axle, and including two rigid links converging forwardly and connected to the axle and guiding it for automatic lateral swinging in trail, and means operable to shift corresponding ends of said links simultaneously toward or away from each other to vary their convergence, for varying the relationship of turning and lateral shifting of said axle during swinging thereof.

34. In combination with a truck frame, a bogie frame rockably supporting the truck frame, unsprung axle means supporting one end of said bogie frame, second axle means supporting the other end of said bogie frame, spring means interposed between said second axle means and said bogie frame, and means reacting directly from said truck frame to raise said second axle means and thereby to tilt said bogie frame relative to said truck frame, rocking of said bogie frame relative to said truck frame thereafter being opposed by said spring means.

WALLACE M. BROWN.